G. W. JOHNSON.
CAR-COUPLING.

No. 178,369. Patented June 6, 1876.

WITNESSES:
Francis McArdle
John Goethals

INVENTOR:
G. W. Johnson
BY
Munn
ATTORNEYS.

UNITED STATES PATENT OFFICE.

GEORGE W. JOHNSON, OF PRINCETON, ASSIGNOR OF ONE-HALF HIS RIGHT TO FRANCIS W. HAUSS, OF GIBSON COUNTY, INDIANA.

IMPROVEMENT IN CAR-COUPLINGS.

Specification forming part of Letters Patent No. 178,369, dated June 6, 1876; application filed May 9, 1876.

*To all whom it may concern:*

Be it known that I, GEORGE W. JOHNSON, of Princeton, Gibson county, Indiana, have invented a new and Improved Car-Coupling, of which the following is a specification:

This invention relates to self-couplers; and consists of a hook and a catch on each bar, so contrived as to form a double coupler, which connects self-actingly, and is disconnected by a chain or cord from above, or from the side, in such manner as to avoid going between the cars.

Figure 1:
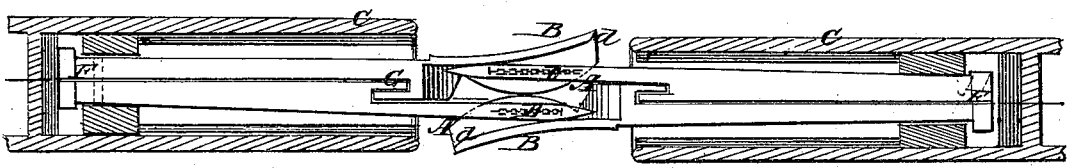
Figure 2:
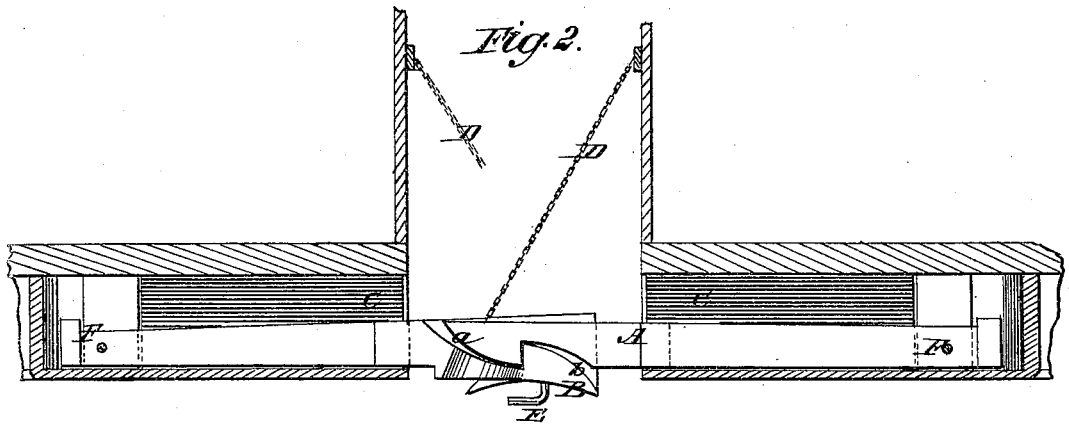

Figure 1 is a horizontal section of the draw-bar and plan view of the couplers. Fig. 2 is a longitudinal sectional elevation of the draw-bars and side elevation of the coupler.

Similar letters of reference indicate corresponding parts.

A represents the hook, and B the catch on each draw-bar C, so contrived that the hook of one draw-bar engages the catch of the other as they come together, the hooks being curved, at $a$, on the under side, to raise up the curved upper side $b$ of the catches, and the catches being flared out sidewise, as at $d$, to prevent the hooks from going outside of the catches. D represents the chains for lifting the hooks to uncouple; and E is a hook attached to the under side of one coupler to couple with a car having the ordinary link-and-pin contrivance. The hook and catch of each draw-bar are fastened at F by a head and a pivot bolt, and they are locked at G to prevent them from separating laterally when uncoupled, the lock being so contrived that the hook is free to rise and fall. The coupler can be placed under the car, so as to use a close platform, if desired.

Having thus described my invention, I claim as new and desire to secure by Letters Patent—

The combination of hook A and a catch, B, in each draw-head, which are interlocked at G, and constructed and arranged to couple self-actingly, substantially as specified.

GEORGE W. JOHNSON.

Witnesses:
JAMES H. CLARK,
JONATHAN SAYLER.